United States Patent [19]

Pierce

[11] 3,931,036

[45] Jan. 6, 1976

[54] COMPACTED ALKALI METAL SILICATE

[75] Inventor: Richard H. Pierce, Broomall, Pa.

[73] Assignee: Philadelphia Quartz Company, Valley Forge, Pa.

[22] Filed: May 13, 1974

[21] Appl. No.: 469,149

[52] U.S. Cl. .................. 252/135; 23/313; 264/117; 264/118
[51] Int. Cl.$^2$ ...... B01J 2/00; B01J 2/20; B01J 2/22; C11D 7/14
[58] Field of Search ................ 252/99, 135; 23/313; 264/117, 118

[56] References Cited
UNITED STATES PATENTS

| | | | |
|---|---|---|---|
| 2,463,680 | 3/1949 | Corrigan | 252/135 X |
| 2,874,123 | 2/1959 | Schaafsma | 252/135 X |
| 3,177,147 | 4/1965 | Dugan | 252/135 X |
| 3,329,616 | 7/1967 | Feierstein | 252/135 X |
| 3,548,046 | 12/1970 | Savage | 264/118 |
| 3,674,700 | 7/1972 | Gaiser | 252/135 |
| 3,687,640 | 8/1972 | Sams et al. | 23/313 |
| 3,748,103 | 7/1973 | Bean | 264/117 |
| 3,764,356 | 10/1973 | Sams | 252/135 X |
| 3,868,227 | 2/1975 | Gericke | 23/313 |

*Primary Examiner*—Dennis E. Talbert, Jr.
*Assistant Examiner*—Dennis L. Albrecht
*Attorney, Agent, or Firm*—Fred C. Philpitt; Ernest G. Posner

[57] ABSTRACT

This invention generally relates to the production of alkali metal silicates. More particularly the invention relates to the production of compressed alkali metal silicate granules of desirable density and particle properties.

10 Claims, No Drawings

COMPACTED ALKALI METAL SILICATE

BACKGROUND

Alkali metal silicate powders and granules, especially sodium silicates, are important components of many detergent formulations. Many such formulations require the silicate to have particular physical characteristics such as a certain particle size and density. In general, small particles of silicate (smaller than 100 mesh) with various densities can be prepared by spray drying and the preparation of particles larger than 100 mesh with low densities (less than 25 lbs/ft$^3$) is fairly routine since silicate particles are easily expanded by heating. This tendency toward expansion on heating renders it difficult to prepare relatively dense particles (bulk density more than 35 lbs/ft$^3$) significantly larger than 100 mesh. Attempts have been made to prepare alkali metal silicate granules with such physical characteristics by compression or compaction techniques. These processes have not been completely successful. It has been necessary to use relatively high pressures to achieve compaction. These high pressures result in the development of relatively high temperatures to which the silicates are exposed during compaction. The silicates become adhesive at these temperatures and glassy bonding between the particles is accomplished but at the same time a build-up of glassy silicate on the compaction equipment is evident and interferes with the process. The glassy sheets produced by such methods are relatively thick and are difficult to grind with the consequent development of numerous fine particles (smaller than 100 mesh) that are unsuitable and must be recycled.

Other materials have also been subjected to compaction to increase the particle size. In one such process an inorganic salt is coated with a liquid hydrocarbon, subjected to a chemical etching step or a mechanical attrition step and then compressed. The resulting thin sheet is then granulated.

SUMMARY OF THE INVENTION

I have found a method of preparing hydrated alkali metal silicate granules that results in improved yields of granules with particle sizes larger than 100 mesh and bulk densities greater than 35 lbs/ft$^3$. The process involves the preparation of a uniform, damp mixture of hydrated alkali metal silicate powder with alkali metal silicate solution in a manner that minimizes the period of contact between the components; introducing this mixture into a means for applying pressure thereby producing a thin sheet of compacted material; aging said compacted material for a significant period, during this aging period said compacted material can be subjected to heating and/or cooling; the compacted material is then granulated.

THE INVENTION

Any powdered or particulate hydrated alkali metal silicate that can absorb further amounts of moisture can be used in the process of this invention. Such materials are obtained by drying alkali metal silicate solutions by any of a number of methods including spray drying, thin-film drying, fluid bed drying and others. I have not found the product of any particular drying method more desirable for the process of my invention than the products of the other drying systems. The composition of such particles is disclosed by the mol ratio of $SiO_2/M_2O$, wherein M stands for an alkali metal and the ratio can vary between 1.6/1.0 and 4.0/1.0. I prefer to use sodium silicate powders with $SiO_2/Na_2O$ mol ratios between 2.0/1.0 and 2.6/1.0. The moisture content of the particles can vary between 10 and 20% but I prefer to use particles with a moisture content of 15 to 19%. Part of the powdered or particulate material used in this invention can be supplied as powdered anhydrous alkali metal silicate glass. Such glass can constitute about 10 to 50% of the powder or particles used in the process of this invention.

These particles are mixed with alkali metal silicate solution with a $SiO_2/M_2O$ mol ratio between 1.6/1.0 and 4.0/1.0. Examples of useful sodium and potassium silicate solutions include:

| Silicate | $SiO_2/M_2O$ Wt. Ratio | Mol Ratio |
|---|---|---|
| B-W Sodium Silicate | 1.60 | 1.65 |
| RU Sodium Silicate | 2.40 | 2.47 |
| N Sodium Silicate | 3.22 | 3.30 |
| S 35 Sodium Silicate | 3.75 | 3.92 |
| Kasil No. 1 Potassium Silicate | 2.5 | 3.92 |

B-W, RU, N, S 35 and Kasil are registered trademarks of the Philadelphia Quartz Company. The important property to be controlled in applying such silicate solutions is the viscosity; the solution must be sufficiently fluid to enable the preparation of the damp mixture quickly. I have found solutions that contain 25 to 45% silicate solids have the required viscosities. I have also found that water is not a satisfactory substitute for the alkali metal silicate solution. It appears that the water is absorbed too quickly and there is not sufficient working time to prepare the required uniform damp mixture.

The damp mixture of hydrated alkali metal silicate powder and alkali metal silicate solution can be prepared in almost any standard blending device such as twin shell or ribbon blenders as long as the preparation of a uniform damp mixture can be accomplished quickly and the powder is maintained in motion during the addition of the silicate solution. The contact time between the silicate powder and solutions appears to be very important. I have found that the contact between the solution and the powder until compaction should be 2 to 8 minutes and I prefer that this period be 2 to 6 minutes. The silicate solution is added to the powder and blended as quickly as possible to obtain a uniform mixture. The addition of the silicate solution should be completed in 1 to 4 minutes, preferably 1 to 2 minutes. The additional blending should be completed in 1 to 4 minutes and preferably 1 to 2 minutes. If the contact time between the powder and solution is longer than about 8 minutes, particularly if the blending step after the addition of the silicate solution is prolonged, compacting is more difficult and the problems inherent in the prior art processes are encountered. Thicker sheets with their resulting low yields of usable particles are the most common results. The same problems are encountered if water is substituted for the silicate solution.

The uniform, damp mixture which consists essentially of 90 to 97% alkali metal silicate powder which may include both hydrated powder and anhydrous glass particles, and 3 to 10% alkali metal silicate solution is immediately subjected to pressure between 2 surfaces. The most convenient method of supplying such pressure is to feed the mixture between compression rollers. I have found that 500 to 2500 psi is required to form a thin compacted sheet. The best sheets which, when granulated, yield more usable particles are formed when 900 to 1600 psi is applied. Pressures of less than about 500 psi result in only loosely agglomerated materials that are not of the desired density. Pressures of more than 3000 psi result in glassy products that deposit on the compacting surfaces and that are difficult to granulate and result in excessive fines which are recycled. The heat developed during these process steps is quite minimal so that the process can be carried out with no supplemental heating. The temperature during these steps can be 5° to 50°C and I prefer the temperature to be 15° to 35°C. Lower temperatures prevent the necessary adsorption of moisture while temperatures higher than this range result in glassy build-up and difficulty in granulation.

The product of the compaction step is a thin dense sheet that is 1/32 to 1/8 of an inch in thickness. If the sheet is thicker than 1/8 of an inch, the granulation of the sheet is more difficult and the yield of useful granules larger than 100 mesh is reduced. If sheets thinner than 1/32 of an inch are produced, the production rate is very low. The sheets so produced can be flaked as they leave the compacting equipment or left whole to age for a period of 5 to 15 minutes before granulation. Surprisingly, I have found that this aging step can be shortened by heating the sheets or flakes for 3 to 8 minutes above 65°C but below 200°C and then cooling these materials to below 21°C in 1 to 10 minutes. Various combinations of these steps have been used with total times of 4 to 12 minutes. The cooling can be carried out in any convenient manner such as blowing air over the sheets or flakes. The sheets or flakes are easily granulated by crushing in various types of mills. The resulting granules are screened and those that are larger than desired are regranulated while the fines are completely recycled.

The products realized from this process are free-flowing white granules with bulk densities of 35 to 75 lbs/ft$^3$. The moisture content is 12 to 26% with a preferred moisture content of 18 to 22%. The particle size of the product is larger than 100 mesh and can consist of numerous particle size ranges such as 10 to 65 mesh. I prefer a particle size of 14 to 65 mesh. The yield of particles with these desirable properties is 50 to 75% based on the raw material used. Such yields are much higher than those found with prior art methods.

Composite products can be made by this process by preparing a mixture of alkali metal silicate powder and an inorganic salt such as sodium sulfate, soda ash and/or sodium tripolyphosphate. This mixture is then subjected to the same process. The inorganic salt can be 10 to 55% of the damp mixture.

The advantages that are realized with the process of this invention are rather surprising. It is surprising that the addition of a relatively small amount of alkali metal silicate solution would result in a process that overcomes the difficulties encountered in prior art processes, especially when an equivalent amount of water does not produce such results. It is also surprising that heating the sheet or flakes after compaction would reduce the time needed for aging before granulation.

EXAMPLES

The following examples illustrate certain embodiments of the invention and should not be considered restrictive. All of the screen sizes used in these examples and throughout the disclosure and claims are for Tyler series screens. All proportions are in parts by weight (pbw) or percent by weight (%) unless otherwise noted.

EXAMPLE 1

This example illustrates a compaction process carried out according to the prior art. Spray dried sodium silicate powder with a ratio of 2.0 $SiO_2/Na_2O$, particle size of less than 100 mesh, and 18% moisture content was compacted. The silicate powder was fed between compression rollers and subjected to 5100 psi. The temperature of the silicate became 175°C because of the energy required to exert this high pressure and to force the silicate powder through the compression rollers. The silicate powder became very adhesive and there was a glassy build-up on the rollers which required the production runs to be of limited duration. The resulting sheet was about ½ inch thick and was difficult to granulate. The granulated material contained 16% of material in the 10 to 65 mesh size range with a bulk density of 58 lbs/ft$^3$. The moisture content was 17.7%.

The same spray dried sodium silicate powder was subjected to 1500 psi. The temperature rose only to 50°C. Only a few loosely compacted groups of particles were formed. The material contains 3% of material in the 10 to 65 mesh size range with a bulk density of 30 lbs/ft$^3$.

EXAMPLE 2

The sodium silicate powder of Example 1 was compacted by the method of this invention. 93 pbw of the silicate powder was charged to a twin shell blender and 7 pbw of sodium silicate solution with a 2.0 $SiO_2/Na_2O$ ratio and a silicate solids content of 40% was added to the powder through an intensifier bar in 2 minutes. Blending was completed in an additional 4 minutes and the damp mixture was fed through the compression roller in 2 minutes. The total contact time of the silicate powder and solution was 8 minutes before compaction. The pressure was 1500 psi. The temperature rose to only 50°C. The compression rollers remained free of glassy buildup throughout the run. The compacted sheet was about ⅛ inch thick and was flaked as it left the compactor. The sheet was aged for about 10 minutes before granulation which yielded 60% granules in the 14 to 65 mesh size range. The bulk density was 48 lbs/ft$^3$ and the moisture content was 19.8%.

EXAMPLE 3

A spray dried sodium silicate with a ratio of 2.4 $SiO_2/1.0$ $Na_2O$, a moisture content of 17% and a particle size smaller than 100 mesh was compacted according to the process of this invention. The twin shell blender was charged with 95 pbw of the silicate powder and 5 pbw of a sodium silicate solution with a 2.4 $SiO_2/1.0$ $Na_2O$ ratio and a silicate solids content of 30% was added to the powder through an intensifier bar in 2 minutes. Blending was completed in an additional 4 minutes and the damp mixture was fed through the compression rollers in 2 minutes. Total contact time of the powder and solution was 8 minutes before compaction. The pressure was 1000 psi. The temperature did not rise to 50°C and the compression rollers remained free of any glassy buildup throughout several runs. The compacted sheet was slightly less than 1.8 of an inch and was flaked as it left the compactor. The compacted sheet was aged for 15 minutes before granulation. The granulated material yielded 65% granules in the 14 to 65 mesh size range. The bulk density was 46 lbs/ft$^3$ and the moisture content was 19.1%.

EXAMPLE 4

The process of Example 3 was repeated except that the compacted sheet was heated to 85°C for 4 minutes and then cooled to 20°C in 2 minutes. The cooled sheet was granulated and the yield of 14 to 65 mesh particles was 67%. The bulk density was 47 lbs/ft$^3$ and the moisture content was 19.0%.

EXAMPLE 5

60 pbw of a spray dried sodium silicate powder with a ratio of 2.0 SiO$_2$/1.0 Na$_2$O were blended with 40 pbw of −325 mesh ground silicate glass with a ratio of 2.0 SiO$_2$/1.0 Na$_2$O in a twin shell blender. 10 pbw of a liquid sodium silicate solution of ratio 2.0 SiO$_2$/1.0 Na$_2$O were added to the dry mix through the intensifier bar in 1 minute. After continued blending for 1 minute the damp mix was fed to the compactor. The compactor with 4 inches face and corrugated rolls was operated at 1200 psig at 40 rpm. The temperature of the ⅛ inch sheet reached the 45°C and the rollers remained free of buildup. The ribbon was shattered and the flakes allowed to cool for 20 minutes before granulation. 60% of the discharge fell in the −10+65 mesh range. The bulk density was 72 lbs/ft$^3$ and the moisture content was 15% and only 0.3% of the product remained undissolved after stirring 5 gms in 100 mls water at 190°F for 5 minutes.

20 lbs. of dense soda ash and 20 lbs. of spray dried sodium silicate powder with a ratio of 3.22 SiO$_2$/1.0 Na$_2$O were mixed in a 2 cu.ft. twin shell blender. 10 lbs. of a liquid sodium silicate solution of ratio 3.22 SiO$_2$/1.0 Na$_2$O were added to the dry mixture through the intensifier bar in 1 minute. After 1 minute of continuous blending, the mix was fed to the compactor with 4 inches face corrugated rollers operated at 30 rpm and 1300 psi. The temperature of the 3/16 inch sheet reached 130°F, and the rollers remained free of buildup. The ribbon was shattered and the flakes allowed to cool for 15 minutes before crushing. 62% of the discharge granules fell in the −10+65 mesh range. The bulk density was 66 lbs/ft$^3$ and the moisture content was 17% and only 0.12% of the product remained undissolved after stirring 5 gms in 100 mls of water at 190°F for 5 minutes.

EXAMPLE 7

The sodium silicate powder of Example 1 was compacted by the method of this invention. 100 pbw of the powder was charged to a Littleford FM130D mixer. 4 pbw of a sodium silicate solution with a ratio of 2.0 SiO$_2$/1.0 Na$_2$O and a solids content of 23% was blended into the powder for 3 minutes at ambient temperature. The damp mixture was immediately forced to a flat roll compactor with 24 inches × 6 inches rolls operating at 10 rpm, 1500 psig with a 0.03 inch gap. A warm plastic 6 inches wide ribbon 0.1 inch thick was cleanly discharged. A compacted specimen had a true density of 1.90g/cm$^3$ and an apparent density of 1.50g/cm$^3$ with a porosity of 21.1%. After cooling for little more than 5 minutes the ribbon hardened to a brittle condition ready for granulation between 6 inches × 6 inches rolls then ground between No. 4, 8 and 12 LePage rolls.

Crushing immediately after collection yielded 40% +14 mesh, 49% 14+65 mesh, and 11% −65 mesh. The same flakes cooled 10 minutes yielded 28% +14 mesh, 59% 14+65 mesh and 13% −65 mesh. Very slight improvement in the 14+65 mesh yield occurred after 30 and 60 minute cooling.

I claim:

1. In the known process of preparing product granules of hydrated alkali metal silicate with a particle size larger than 100 mesh, a mol ratio of SiO$_2$/M$_2$O between 1.6/1.0 and 4.0/1.0 wherein M stands for an alkali metal, a bulk density of 35 to 75 lbs/ft$^3$ and a moisture content of 12 to 26%, the improvement comprising:
    a. preparing a damp, uniform mixture of 90 to 97% alkali metal silicate powder and 3 to 10% alkali metal silicate solution by:
        1. maintaining said alkali metal silicate powder with a moisture content of 10 to 20% and a particle size of less than 100 mesh in motion while adding to said powder the alkali metal silicate solution containing 25 to 45% silicate solids in 1 to 4 minutes, and
        2. blending said mixture for 1 to 4 minutes by maintaining it in motion;
    b. subjecting said mixture to a pressure between 500 and 2500 psi, thereby forming a compacted sheet of 1/32 to ⅛ inch thickness;
    c. aging the compacted material for 5 to 15 minutes; and
    d. granulating said sheet and recovering 50 to 75% of the resulting granules that are larger than 100 mesh.

2. The process of claim 1 wherein the alkali metal silicate powder has a SiO$_2$/M$_2$O mol ratio between 2.0/1.0 and 2.6/1.0 with a moisture content of 15 to 19%.

3. The process of claim 1 wherein the addition of the alkali metal silicate solution is completed in 1 to 2 minutes and the blending after the addition is completed in 1 to 2 minutes.

4. The process of claim 1 wherein said damp, uniform mixture of alkali metal silicate powder and alkali metal silicate solution is subjected to a pressure of 900 to 1600 psi.

5. The process of claim 1 wherein the alkali metal silicate powder of step (a) (1) includes 75 to 90% hydrated alkali metal silicate powder and 10 to 50% anhydrous alkali metal silicate glass.

6. In the known process of preparing product granules of hydrated alkali metal silicate with a particle size larger than 100 mesh, a mol ratio of SiO$_2$/M$_2$O between 1.6/1.0 and 4.0/1.0 wherein M stands for an alkali metal, a bulk density of 35 to 75 lbs/ft$^3$ and a moisture content of 12 to 26%, the improvement comprising:
    a. preparing a damp, uniform mixture of 90 to 97% alkali metal silicate powder and 3 to 10% alkali metal silicate solution, by:
        1. maintaining said alkali metal silicate powder with a moisture content of 10 to 20% and a particle size of less than 100 mesh in motion while adding to said powder the alkali metal silicate solution containing 25 to 45% silicate solids in 1 to 4 minutes, and
        2. blending said mixture for 1 to 4 minutes by maintaining it in motion.
    b. subjecting said mixture to a pressure between 500 and 2500 psi, thereby forming a compacted sheet of 1/32 to ⅛ inch thickness;

c. heating the compacted material to a temperature of 65° to 200°C for 3 to 8 minutes;

d. cooling the compacted material to below 21°C in 1 to 10 minutes; and e. granulating said compacted material and recovering 50 to 75% of the resulting granules that are larger than 100 mesh.

7. The process of claim 6 wherein the alkali metal silicate powder has a $SiO_2/M_2O$ mol ratio between 2.0/1.0 and 2.6/1.0 with a moisture content of 15 to 19%.

8. The process of claim 6 wherein the addition of the alkali metal silicate solution is completed in 1 to 2 minutes and the blending after the addition is completed in 1 to 2 minutes.

9. The process of claim 6 wherein said damp, uniform mixture of alkali metal silicate powder and alkali metal silicate solution is subjected to a pressure of 900 to 1600 psi.

10. The process of claim 6 wherein the alkali metal silicate powder of step (a) (1) includes 75 to 90% hydrated alkali metal silicate powder and 10 to 50% anhydrous alkali metal silicate glass.

* * * * *